(12) United States Patent
Jitsui

(10) Patent No.: US 6,729,428 B2
(45) Date of Patent: May 4, 2004

(54) DEVICE FOR DETECTING TENSILE FORCE OF SEAT BELT

(75) Inventor: Akinori Jitsui, Okazaki (JP)

(73) Assignee: Denso Corporation, Kariya (JP)

( * ) Notice: Subject to any disclaimer, the term of this patent is extended or adjusted under 35 U.S.C. 154(b) by 88 days.

(21) Appl. No.: 10/125,416

(22) Filed: Apr. 19, 2002

(65) Prior Publication Data

US 2002/0189879 A1 Dec. 19, 2002

(30) Foreign Application Priority Data

Jun. 15, 2001 (JP) ........................................ 2001-181944

(51) Int. Cl.⁷ ............................................... B60R 21/00
(52) U.S. Cl. ..................... 180/268; 180/273; 280/801.1
(58) Field of Search ......................... 701/45; 280/735, 280/801.1; 180/268, 271, 273; 73/1.15, 720, 726

(56) References Cited

U.S. PATENT DOCUMENTS

| | | | | |
|---|---|---|---|---|
| 4,457,251 A | * | 7/1984 | Weman et al. | ............... 116/212 |
| 5,400,868 A | * | 3/1995 | Ellis et al. | ................... 182/18 |
| 5,431,447 A | * | 7/1995 | Bauer | ........................ 280/805 |
| 5,997,097 A | * | 12/1999 | Engelhard | ................... 297/472 |
| 6,209,915 B1 | * | 4/2001 | Blakesley | ................ 280/801.1 |
| 6,230,088 B1 | * | 5/2001 | Husby | .......................... 704/45 |
| 6,264,236 B1 | * | 7/2001 | Aoki | .......................... 280/735 |
| 6,301,977 B1 | * | 10/2001 | Stojanovski | ........... 73/862.393 |
| 6,502,860 B1 | * | 1/2003 | Siegfried et al. | ........ 280/801.1 |
| 6,583,367 B2 | * | 6/2003 | Wolfe et al. | ................ 177/136 |
| 6,595,545 B2 | * | 7/2003 | Curtis et al. | ................ 280/735 |

FOREIGN PATENT DOCUMENTS

JP  A 2000-296757  10/2000

* cited by examiner

Primary Examiner—Brian L. Johnson
Assistant Examiner—Brian L Swenson
(74) Attorney, Agent, or Firm—Oliff & Berridge, PLC

(57) ABSTRACT

A device for detecting a tensile force of a seat belt composed of an elastic plate having a strain gauge mounted thereon and a protecting plate overlapped on the elastic plate is installed in a seat belt. Under a normal situation, seat belt tensile force is applied only to the elastic plate which is deformable according to the tensile force. The elastic plate is broken when a high tensile force exceeding a predetermined level is applied thereto, while the protecting plate remains unbroken by such a high tensile force. The seat belt tensile force under the normal situation is precisely detected by the strain gauge mounted on the elastic plate, and the seat belt function to protect a passenger is maintained by the protecting plate when the high tensile force is generated by an accidental collision or the like.

4 Claims, 3 Drawing Sheets

DEVICE FOR DETECTING TENSILE FORCE OF SEAT BELT

CROSS-REFERENCE TO RELATED APPLICATION

This application is based upon and claims benefit of priority of Japanese Patent Application No. 2001-181944 filed on Jun. 15, 2001, the content of which is incorporated herein by reference.

BACKGROUND OF THE INVENTION

1. Field of the Invention

The present invention relates to a device for detecting a tensile force of a seat belt used in an automobile vehicle.

2. Description of Related Art

Recently, a regulation for prohibiting an air-bag operation when a small child is seated on a passenger seat is being discussed. It is necessary to detect a weight and a size of a passenger to meet this regulation. A system for detecting a weight of a passenger is known hitherto. However, a body size of a passenger is difficult to be detected only by the weight detector because a load imposed on a passenger seat increases when a child seat is fixed by a seat belt. To cope with this problem, JP-A-2000-296757 proposes a system which detects a passenger's weight and size by combining a weight sensor and a tensile force detector of a seat belt.

However, it is very difficult to make a tensile force detector that precisely detects a tensile force at a low level and is durable against a high impact force generated upon an accidental collision or the like. It is required for the seat belt tensile force detector to accurately detect a low level force of about one N (newton) in detecting a passenger size. On the other hand, it has to endure a very high level force in excess of 22,300 N (according to a JIS-D4609) which is imposed upon a vehicle collision. It is a difficult task for the seat belt tensile force detector to satisfy both requirements.

SUMMARY OF THE INVENTION

The present invention has been made in view of the above-mentioned problem, and an object of the present invention is to provide an improved seat belt tensile force detector that is able to precisely detect a low level tensile force and is durable against a very high impact force.

A device for detecting a tensile force applied to a seat belt is composed of a tensile force detector having a strain gauge and a protecting plate overlapped on the tensile force detector. The detecting device is installed in the seat belt in line with the tensile force applied to the seat belt. The tensile force detector is composed of an elastic plate that elastically deforms according to the tensile force applied thereto and a strain gauge mounted thereon. While the elastic plate elastically deforms according to the tensile force, it breaks off when a large tensile force exceeding a predetermined level is applied thereto. On the other hand, the protecting plate has a high tensile strength that is able to endure a very large tensile force generated by a vehicle collision or the like.

The detecting device is installed in the seat belt, so that the tensile force is applied only to the elastic plate under a normal situation and is applied to the protecting plate when the elastic plate is broken by a high tensile force. A relatively small tensile force applied to the seat belt by a passenger is precisely measured by the strain gauge mounted on the elastic plate, and a size of a passenger can be detected based on the measured tensile force. On the other hand, when the elastic plate is broken, the seat belt function to protect a passenger is maintained by the protecting plate having a-high tensile strength.

Both of the elastic plate and the protecting plate are flexibly connected to the seat belt via a pair of circular belts so that the tensile force of the seat belt is measured without being influenced by postures of a seat belt buckle or other connecting portions. Both of the elastic plate and the protecting plate have a pair of rectangular slits through which the circular belts are flexible inserted. A distance between two slits of the elastic plate is made smaller than that of the protecting plate, so that the tensile force is applied only to the elastic plate under a normal situation.

Other objects and features of the present invention will become more readily apparent from a better understanding of the preferred embodiment described below with reference to the following drawings.

DETAILED DESCRIPTION OF THE PREFERRED EMBODIMENT

Figure 1A:
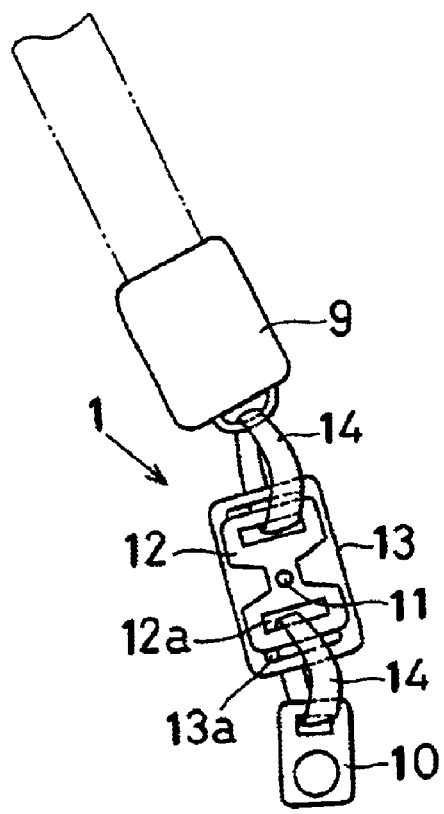
FIG. 1A is a perspective view showing a device for detecting a tensile force of a seat belt, the device being anchored to an anchor plate fixed to a vehicle body.
Figure 3:
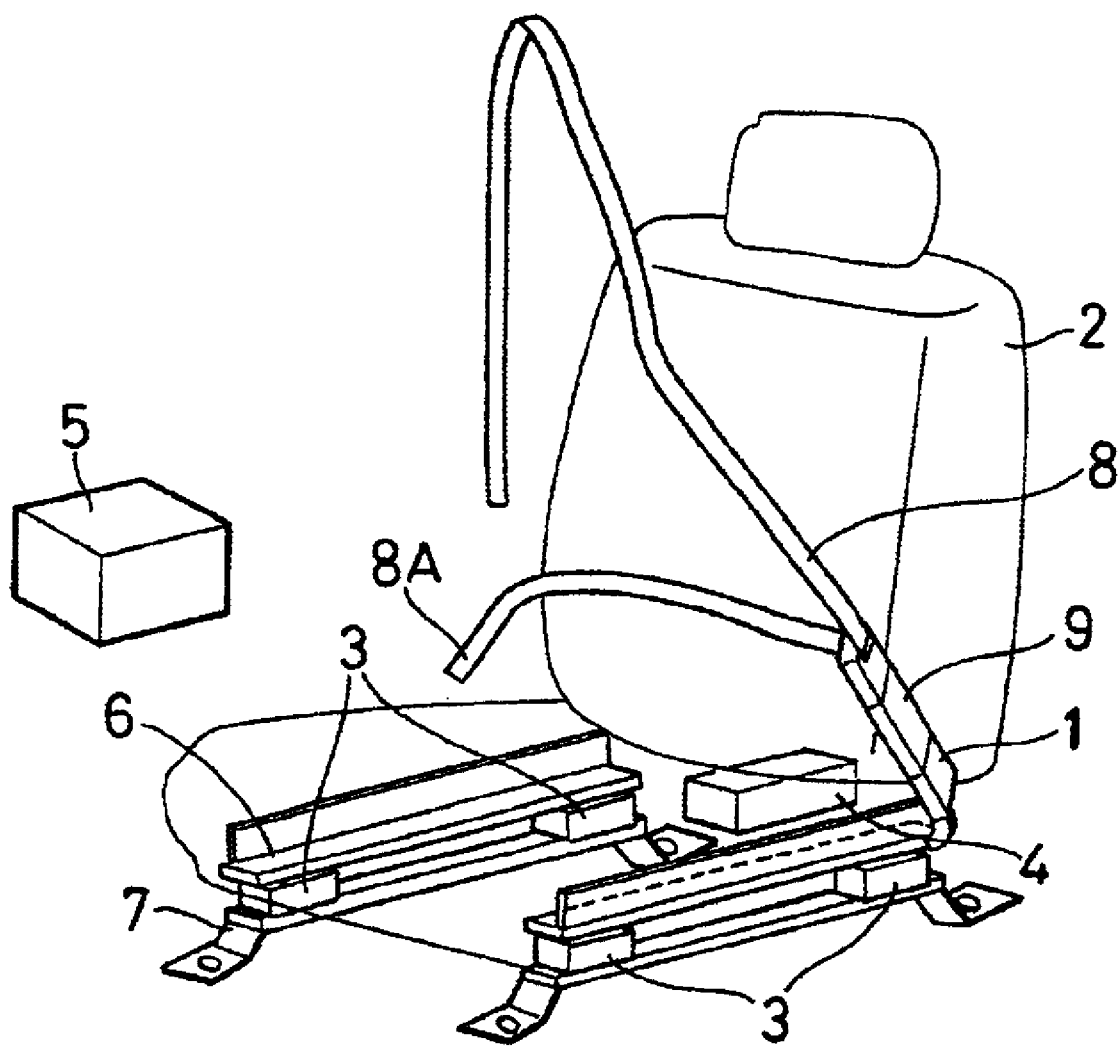
FIG. 3 is a perspective view showing a passenger seat having a seat belt to which the tensile force detector shown in FIG. 1 is connected.
Figure 4:
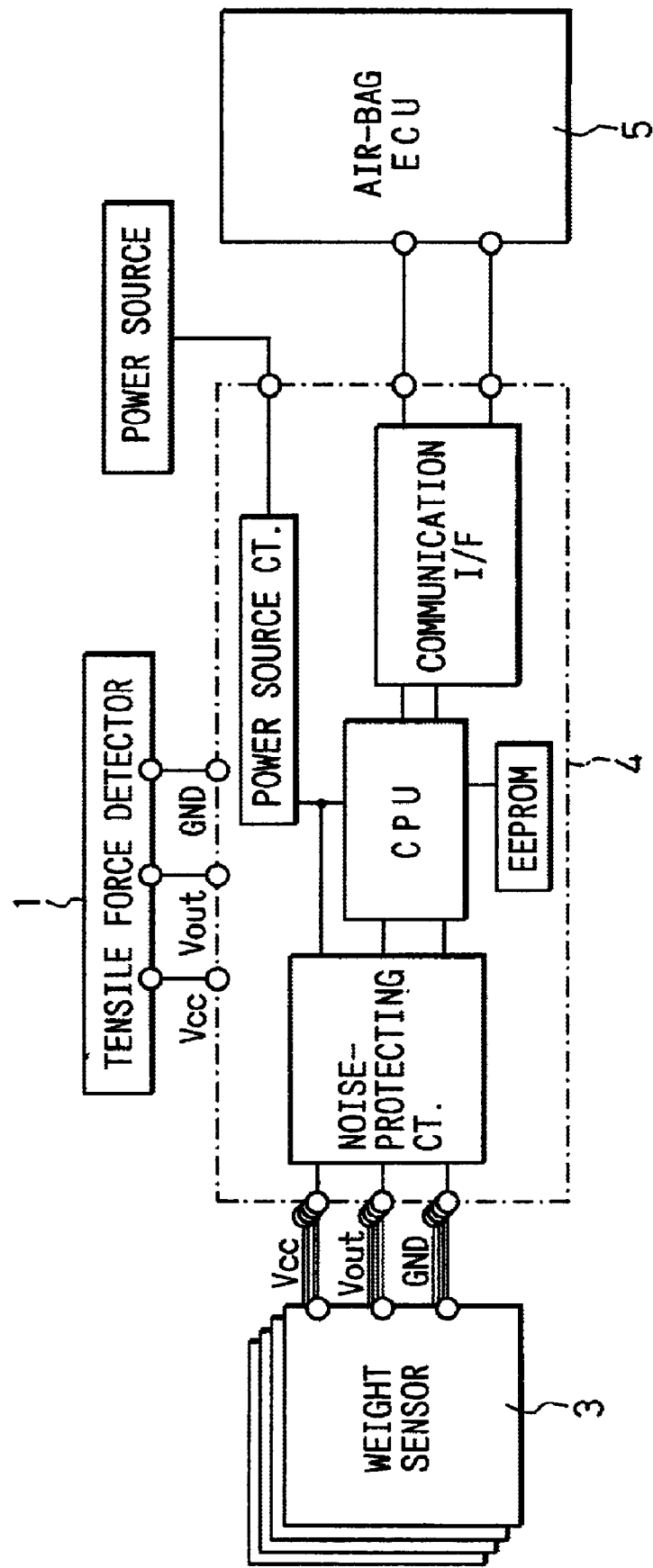
FIG. 4 is a block diagram showing an air-bag control system including the tensile force detector.

A preferred embodiment of the present invention will be described with reference to the accompanying drawings. A device 1 for detecting a tensile force of a seat belt, shown in FIG. 1A, is installed in a seat belt as shown in FIG. 3. As shown in FIG. 4, a system for detecting a passenger's size and weight including the tensile force detecting device 1 and weight sensors 3 is connected to a passenger-detecting ECU (electronic control unit) 4. An air-bag ECU 5 is also connected to the passenger-detecting ECU 4.

First, referring to FIG. 3, a structure of a passenger seat including the seat belt tensile detector will be described. Weight sensors 3 for detecting a weight of a passenger are disposed between an upper frame 6 and a lower frame 7 at four corners of a passenger seat 2. The seat belt tensile force detecting device 1 for detecting a tensile force applied to a seat belt having a shoulder seat belt 8 and a waist seat belt 8A is connected to the seat belt. The passenger-detecting ECU 4 is positioned behind the seat 2.

As shown in FIG. 1A, the seat belt tensile force detecting device 1 (referred to as a device) is installed between a seat belt buckle 9 and an anchor plate 10 fixed to a vehicle body. The device 1 is composed of an elastic plate 12 having a strain gauge 11 mounted at its center and a protecting plate 13. The elastic plate 12 and the protecting plate 13 are overlapped on each other and connected to the buckle 9 and to the anchor plate 10 via a pair of circular belts 14. The circular belt 14 is made of a material which is the same as that of the seat belt 8. The device 1 is installed between the buckle 9 and the anchor plate 10, so that the device 1 is flexibly movable. In other words, the device 1 is not rigidly fixed to the buckle 9 and the anchor plate 10.

The elastic plate 12 has a narrow portion formed at its center portion and a pair of rectangular slits 12a formed at its both ends. The strain gauge 11 is mounted on at a center of the narrow portion. When a tensile force is applied to the elastic plate 12, the elastic plate 12 elastically deforms in a direction of the tensile force, especially at its center portion where the strain gauge 11 is mounted. When an excessive tensile force is applied to the elastic plate 12, the elastic plate 12 is broken at its narrow portion. An electric resistance of the strain gauge 11 changes according to the elastic deformation of the narrow portion, and an output voltage representing the electric resistance is outputted from the strain gauge 11.

The protecting plate 13 is made of a metallic material having a predetermined thickness and has a sufficient tensile strength endurable against a very high impact force generated at a vehicle collision. The protecting plate 13 has a pair of rectangular slits 13a formed at its both ends. A distance between both slits 13a is made larger than a distance between the pair of slits 12a formed in the elastic plate 12. The circular belts 14 are coupled to both of the elastic plate 12 and the protecting plate 13 through respective slits 12a and 13a. In other words, both the elastic plate 12 and the protecting plate 13 are disposed in line with the tensile force of the seat belt in parallel to each other.

Since the distance between two slits 12a of the elastic plate 12 is smaller than the distance between two slits 13a of the protecting plate 13, the seat belt tensile force is applied only to the elastic plate 12 when the tensile force does not exceed a predetermined level. On the other hand, when the tensile force in excess of the predetermined level is applied to the device 1, the elastic plate 12 is broken and the tensile force is applied to the protecting plate 13.

Referring to FIG. 4, how the electrical signal from the tensile force detector 1 is used in an air-bag control system will be explained. The passenger-detecting ECU 4 calculates a weight imposed on the seat 2 by summing up the outputs from four weight sensors 3. The electrical signal from the tensile detector 1 is also fed to the passenger-detecting ECU 4. The passenger-detecting ECU 4 determines whether the operation of the air-bag is permitted or not, based on the weight imposed on the seat 2 and the signal fed from the tensile force detector 1. A signal indicating the determination of the passenger-detecting ECU 4 is fed to the air-bag ECU 5. The air-bag ECU 5 generates a signal to operate (inflate) the air-bag when an excessive deceleration is detected, if the operation is not prohibited by the passenger-detecting ECU 4. If it is prohibited, the air-bag is not inflated.

Figure 2:
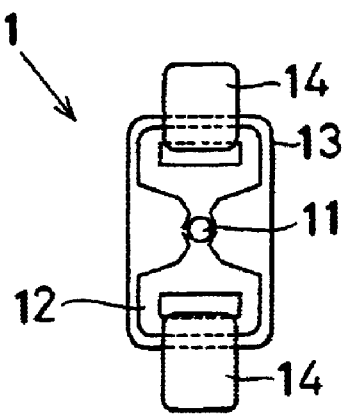
FIG. 2 is a plan view showing the tensile force detector, wherein an elastic plate carrying a strain gauge thereon is broken.

Operation and advantages of the tensile force detecting device described above will be explained. Under a normal condition, the tensile force of the seat belt is applied only to the elastic plate 12 having the strain gauge 11 thereon. The strain gauge 11 outputs an electrical signal corresponding to the tensile force of the seat belt. On the other hand, when a high tensile force exceeding a predetermined level is generated by a collision or the like, the elastic plate 12 is broken at its center portion as shown in FIG. 2, and the tensile force is applied to the protecting plate 13. Since the protecting plate 13 has a high tensile strength, it endures the high tensile force generated by a collision. Therefore, a passenger can be protected by the seat belt.

As described above, the tensile force detecting device of the present invention is able to detect the seat belt tensile force at a low level under a normal condition and is able to maintain the seat belt function when a very high tensile force is generated by a collision. Further, since the tensile force detecting device is flexibly coupled to the buckle 9 and the anchor plate 10 through a pair of circular belts 14, its posture is not restricted by the buckle 9 and the anchor plate 10. Therefore, the seat belt tensile force is purely detected without being influenced by other forces applied to the buckle 9 and the anchor plate 10.

Figure 1B:
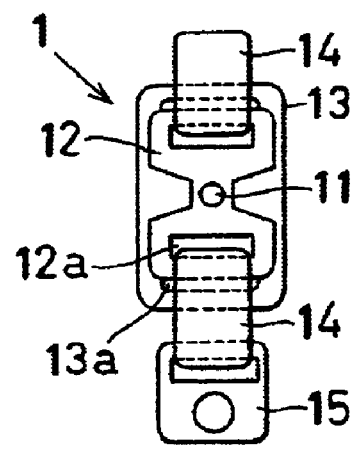
FIG. 1B is a plan view showing a device for detecting a tensile force of a seat belt, the device being anchored to another anchor plate for a waist seat belt.

Though the tensile force detecting device 1 shown in FIG. 1A is installed between the buckle 9 of the shoulder belt 8 and the anchor plate 10, it may be installed between the waist belt 8A (shown in FIG. 3) and an anchor plate 15 for the waist belt, as shown in FIG. 1B. It is also possible to install the tensile force detecting device 1 in the seat belt extending form a tongue plate coupled with the buckle 9.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A device for detecting a tensile force of a seat belt comprising:
   a tensile force detector; and
   a protecting plate having a tensile strength higher than that of the tensile force detector, wherein:
      the tensile force detector and the protecting plate are disposed in line with the tensile force of the seat belt, so that the tensile force is applied in parallel to both of the tensile force detector and the protecting plate, thereby protecting a passenger by the protecting plate even when the tensile force exceeding a strength of the tensile force detector is applied to the seat belt, wherein the tensile force detector includes an elastic plate which is elastically deformable by the tensile force and a strain gauge mounted on the elastic plate, and the elastic plate is broken and the protecting plate remains unbroken when the tensile force exceeding a predetermined level is applied thereto.

2. The device for detecting a tensile force of a seat belt as in claim 1, wherein:
   both ends of the elastic plate and the protecting plate are flexibly connected to the seat belt and to an anchor position via connecting members.

3. The device for detecting a tensile force of a seat belt as in claim 2, wherein:
   the connecting members are made of a same material as that of the seat belt.

4. The device for detecting a tensile force of a seat belt as in claim 1, wherein:
   the tensile force is applied only to the elastic plate when the tensile force is lower than the predetermined level.

* * * * *